July 25, 1967 W. L. SHEFFIELD 3,332,821
APPARATUS FOR MAKING STRAND REINFORCED WEBS
Filed Sept. 2, 1965

INVENTOR.
WILBUR L. SHEFFIELD
BY
Oldham & Oldham
ATTORNEYS

United States Patent Office 3,332,821
Patented July 25, 1967

3,332,821
APPARATUS FOR MAKING STRAND REINFORCED WEBS
Wilbur L. Sheffield, Boston, Mass., assignor, by mesne assignments, to Stauffer Chemical Company, New York, N.Y., a corporation of Delaware
Filed Sept. 2, 1965, Ser. No. 484,658
3 Claims. (Cl. 156—426)

ABSTRACT OF THE DISCLOSURE

A pair of endless helically wound metal springs are present in the apparatus and are so supported as to provide opposed parallel reaches of the springs. These parallel reach portions of the springs are advanced and strands are wound helically around the parallel reaches of the spring to form a web. Plastic may be applied to the web to aid in retaining the strands in deposited positions.

---

This invention relates to apparatus for making strand reinforced webs, and, more particularly, is concerned with apparatus of this type wherein strands are wound helically upon spaced parallel reaches of endless helically wound metal springs.

It is the general object of the present invention to provide relatively inexpensive, easily operated, and inexpensively maintained apparatus for producing strand reinforced webs wherein the strands are wound helically upon parallel reaches of endless metal springs to produce a web, the springs with the webs thereon then being held and guided without deflection as the web is advanced through a plastic applying station, a plastic curing station, knife means for cutting the web from the springs, and a windup apparatus for the web.

Another object of the invention is the provision of apparatus of the character described wherein a pair of endless rubber V-belts are utilized to grip each parallel reach of the metal springs with the web thereon, each belt being gripped by V-shaped carriers mounted on an endless chain, and with the chains rolling in turn on fixed guides.

Another object of the invention is to provide apparatus for making skrim fabrics where the weft cords or strands are carried by, and extend between, a pair of driven continuously advancing, endless coil springs.

Another object of the invention is the provision of means for selectively adjusting the speed of movement of the parallel reaches of the metal springs in relation to the rotary speed of the means for helically winding the strands on the reaches so as to control the helix angle and the spacing between the strands, the aforesaid means usually being employed in conjunction with means for applying plastic to the strands as positioned.

The foregoing objects of the invention and other objects which will become apparent as the description proceeds, are achieved by the provision of apparatus for making strand reinforced webs including a pair of endless helically wound metal springs, means supporting the springs to provide opposed parallel reaches, means for advancing the parallel reaches, means for helically winding strands around the advancing parallel reaches to provide a web, means engaging the springs on the parallel reaches thereof immediately after the formation of the web and holding the reaches against deflection as the web is advanced by the advancing springs, means for applying plastic to the web, means for cutting the web from the springs, and means for winding up the web.

Figure 1:
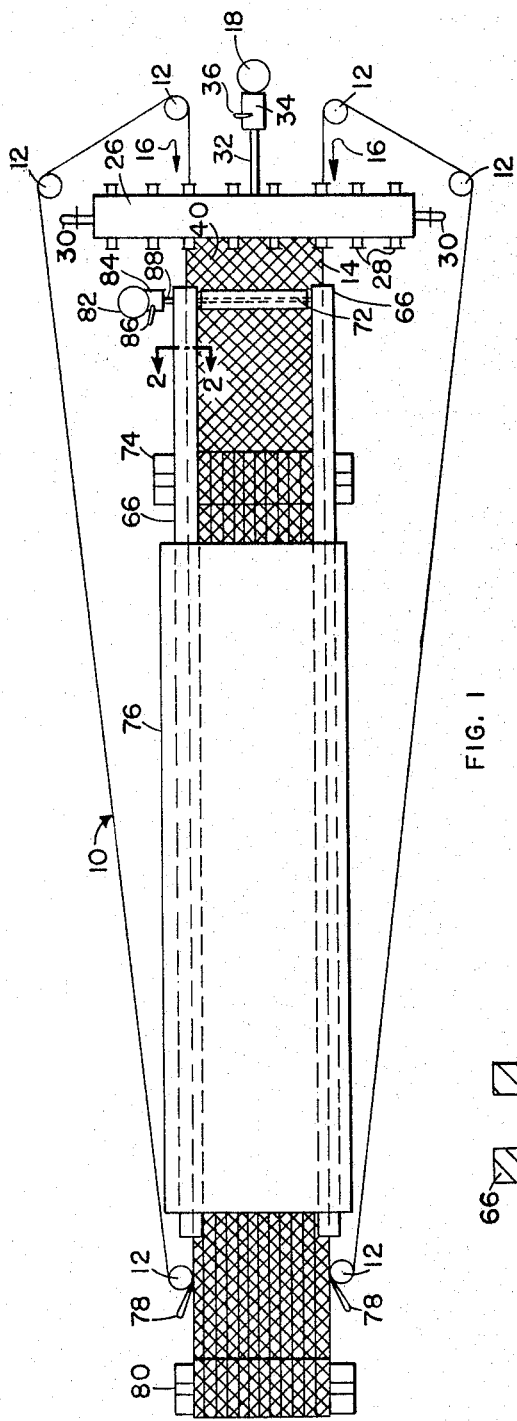
Figure 3:
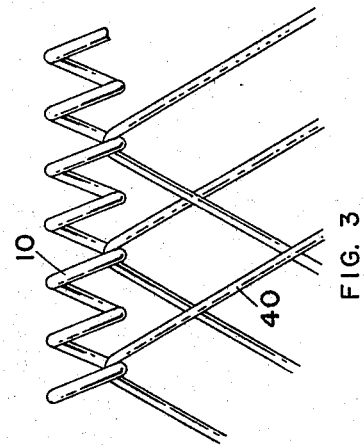
Figure 2:
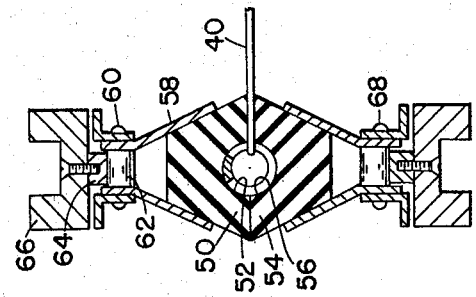

For a better understanding of the invention reference should be had to the accompanying drawings wherein:

FIGURE 1 is a plan view of an embodiment of the apparatus incorporating the principles of the invention;

FIGURE 2 is an enlarged fragmentary cross sectional view taken substantially on line 2—2 of FIGURE 1 and illustrating the opposed V-belts and chains for supporting one parallel reach of the metal springs of the apparatus; and FIGURE 3 is an enlarged fragmentary plan view, illustrating the strands wound helically upon the endless helically wound metal springs, prior to the endless helically coiled metal spring entering into the grip of one of the endless rubber V-belts.

Having more particular reference to the drawings, the numeral 10 indicates generally each of a pair of endless helically coiled metal springs appropriately mounted by means 12 so as to provide rather widely spaced parallel reaches 14 which extend in the manner illustrated substantially the full length of the apparatus of FIGURE 1. In a typical embodiment of the apparatus the springs 10 have a diameter of ⅝ of an inch and are made from sixteen gage wire.

The springs 10 are continuously advanced in the directions of the arrows 16, by a pair of opposed V-belts 50 and 54, as seen in FIG. 2, and more fully described hereinafter. The springs are held as they advance by support rollers 12.

Mechanism is provided for helically winding strands on the parallel reaches 14 of the springs as these reaches are advanced in the direction of the arrows 16, and such mechanism conveniently takes the form of a spinner ring 26 carrying a plurality of strand bearing spindles 28 thereon, this ring surrounding the reaches 14 and being carried by rollers 30. The spinner ring is rotated by a shaft 32 extending from a reduction gear box 34 which is driven by an appropriate motor 18. A variable spaced control 36 is provided on the gear box 34 so that the relative speed of the metal springs as they are advanced in the reaches 14 is so related with the rotating speed of the spinner ring 26 and the pitch of the metal springs so that the strands indicated by the numeral 40 in each of FIGURES 2 and 3 are at selected and uniform spacings in the resulting web. By properly correlating the relative speeds of the forward movement of the reaches 14 and the rotary speed of the spinner rings 26 the strands 40 can be wound upon every convolution of the spring 10, upon every second convolution, every third convolution, or on substantially the selected convolution.

It will be recognized that the strands 40 as they are wound upon the parallel reaches 14 of the springs 10 adjacent the spinner ring 26 are wound on these reaches in a helical manner, each helical wrap slipping through the convolutions of the spring 10 and ending up being held by the spring in the manner shown in FIGURE 3.

It is now necessary to support the springs 10 and hold them against deflection during the time that the web resulting from the overlapping strands 40 passes through the remainder of the apparatus. This is accomplished by adapting the parallel reaches 14 of the springs 10 to be held against deflection by means of a pair of opposed V-belts, and this structure is more particularly shown in FIGURE 2. One endless V-belt 50 formed with a semi-circular opening 52 in its widest face engages the upper half of the spring 10 while a second endless V-belt 54 engages by means of a semi-circular opening 56 in its wide face with the other half of the outer surface of the spring 10, the strands 40 extending laterally from the spring 10 and engaged by the flat surfaces of the V-belts in the manner shown in FIGURE 2. The V-belt 50 is carried in V-shaped metal guides 58 of relatively linear short length each carried upon a link of a chain indicated as a whole by the numeral 60, the chain 60 also being endless. The endless chain 60 has rollers 62 rotatable upon a hardened guide plate 64 mounted on fixed channels 6. The V-belt 54 is carried upon a similar chain and support, his being indicated as a whole by the numeral 68 and inasmuch as this chain and its support is identical to that already described the chain 68 will not be described in detail.

The resulting structure provides a very firm and positive holding of each parallel reach 14 of each spring 10 throughout the remainder of the travel of the parallel reaches through the apparatus. The web formed by the strands 40 is thus held flat and taut during the travel of the web through the apparatus so that subsequent operations can be performed on the web in the manner soon to be described.

Associated with the apparatus are means 72 for applying plastic to the web of strands 40. Usually this plastic applying apparatus is in the form of a bank or row of plastic spray guns 72 which apply liquid plastic with a curing agent therein to the web of strands. The plastic applying means can in addition to the spraying operation, or as an alternative thereto, apply a continuous sheet of plastic to the web of strands by making the mechanism 72 to include a roll of plastic sheet, paper, or the like which can be applied to the web. Also, at another station indicated by the numeral 74 it is possible to provide a plurality of longitudinally extending strands to the web, to the top thereof, the bottom thereof, or both should this be found advisable.

The web next passes to a drying or curing oven indicated by the numeral 76, appropriately heated to effect the curing up of the plastic and the web of strands. As the web passes from the oven 76 knives 78 sever the web from the springs 10, usually adjacent the support means 12 and the finished web is wound up upon suitable means 80.

There is considerable weight and some friction present in the opposed V-belt and chain guide mechanism of FIGURE 2 and it is usually advisable to drive the chains 60 and 68 and thus the opposed V-belts 50 and 54. This is accomplished by the provision of a motor 82 operating through a reduction gear box 84 and having a speed control 86 thereon, the gear box 84 being connected to effect the drive described by means of a shaft 88 and appropriate gearing.

The springs 10 preferably are no coarser than a pitch of 8 coils per inch and the speed of the springs re the rotation of the spinner ring 26 is such that the strands 40, for example, are at an angle of about 45° to the axis of the springs. The springs 10 can be supported, for example, upon guide rolls (not shown) immediately prior to deposit of the strands 40 thereon. The V-belts 50 and 56 may engage the springs 10 as close as about 6 inches from deposit of the strands thereon. As indicated, any suitable longitudinally extending cords, sheet, or fabric may be combined with the strands 40.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for making strand reinforced webs including a pair of endless helically wound metal springs, means supporting the springs to provide opposed parallel reaches, means for advancing the parallel reaches, means for helically winding strands around the advancing parallel reaches to provide a web, and means to vary the forward speed of the parallel reaches of the springs in relation to the rotary speed of the means for helically winding the strands to control the spacing and angle of the strands in the web.

2. Apparatus for making strand reinforced webs including a pair of endless helically wound metal springs, means supporting the springs to provide opposed parallel reaches, means for advancing the parallel reaches, and means for helically winding strands around the advancing parallel reaches to provide a web.

3. Apparatus for making strand reinforced webs including a pair of endless helically wound metal springs, means supporting the springs to provide opposed parallel reaches, means for advancing the parallel reaches, means for helically winding strands around the advancing parallel reaches to provide a web, means for applying plastic to the web, means for cutting the web from the springs, and means for winding up the web.

No references cited.

EARL M. BERGERT, *Primary Examiner.*

J. P. MELOCHE, *Assistant Examiner.*